United States Patent [19]

Bergkvist

[11] 4,427,364

[45] Jan. 24, 1984

[54] FLUIDIZABLE BED COMBUSTION CHAMBER

[75] Inventor: Jörgen Bergkvist, Finspong, Sweden

[73] Assignee: Stal-Laval Turbin AB, Sweden

[21] Appl. No.: 310,265

[22] Filed: Oct. 9, 1981

[30] Foreign Application Priority Data

Oct. 22, 1980 [SE] Sweden .............................. 8007401

[51] Int. Cl.³ .............................................. F27B 15/10
[52] U.S. Cl. ..................................... 431/170; 110/245; 122/4 D; 422/143; 422/311
[58] Field of Search ............... 432/15, 58; 431/7, 170; 34/57 A, 57 C; 122/4 D; 422/139, 143, 311; 110/245

[56] References Cited

U.S. PATENT DOCUMENTS

| | | | |
|---|---|---|---|
| 2,944,009 | 7/1960 | Huntley et al. | 422/143 |
| 3,238,023 | 3/1966 | Craig et al. | 422/143 |
| 3,552,033 | 1/1971 | Steever et al. | 34/57 A |
| 4,171,945 | 10/1979 | Lazenby | 431/170 |
| 4,300,458 | 11/1981 | Comparato et al. | 110/263 |

FOREIGN PATENT DOCUMENTS 55-99334  7/1980 Japan ..................................... 422/143

*Primary Examiner*—Lee E. Barrett
*Attorney, Agent, or Firm*—Pollock, Vande Sande & Priddy

[57] ABSTRACT

A fluidizable bed combustion chamber comprises an intermediate partition (2,7) which divides the chamber into an upper combustion space (1a) and a lower plenum (1b) and which is provided with means (4,4a,8) for injecting fuel into the upper combustion space in which, during use of the combustion chamber, a bed of fluidized material (6) is created. The intermediate partition is composed of a plurality of nested modules (7), each of polygonal shape and having a substantially centrally positioned fuel supply member (8). Each corner surface (9) of each module is upwardly inclined in the direction away from the center of the module, and these corner surfaces are provided with openings (10) enabling air to be injected into the upper combustion space from the plenum chamber. Preferably, the modules are of regular polygonal shape, for example triangular, quadratic or hexagonal.

16 Claims, 5 Drawing Figures

FLUIDIZABLE BED COMBUSTION CHAMBER

TECHNICAL FIELD

This invention relates to a fluidizable bed combustion chamber of the kind comprising an intermediate partition which divides the combustion chamber into an upper combustion space and a lower plenum chamber, and which is provided with means for injecting air and fuel into the upper combustion space in which, in use of the combustion chamber, a bed of fluidized material is created.

To achieve a good combustion efficiency in a bed of fluidized material there are required, on the one hand, a good mixing of air and fuel at the feeding-in zone and, on the other hand, a sufficient dwell time of the air/fuel mixture in the bed material. The first-mentioned requirement, in particular, demands a careful construction of the intermediate partition with the associated fuel and air supply devices. It is also important to have a design which is convenient both from the point of view of initial assembly and subsequent servicing.

The present invention aims to provide a fluidizable bed combustion chamber of the kind referred to which satisfies the above-mentioned requirements in a simple manner.

DISCLOSURE OF THE INVENTION

According to the invention, in a fluidizable bed combustion chamber of the kind referred to, the intermediate partition is composed of modules each of polygonal shape with a substantially centrally positioned fuel supply member and with corners upwardly inclined in the direction away from the center of the module, the corners comprising openings enabling air to be injected into the upper combustion space from the plenum chamber.

Preferably, the modules have such a shape that they nest together to provide, without the need for any additional filling members, an intermediate partition having a coherent surface for supporting the fluidizable bed material. Possible shapes for the modules to achieve such a nesting together, for example irregular pentagonal modules, will readily occur to those versed in the art. However, there is an advantage in selecting modules of regular polygonal shape, since these can be assembled together very easily without it being necessary to consider the orientation of each module. When regular polygonal modules are employed, the corner angles of the nested group of the modules must together add up to 360°, which means that the corner angles always have to be integer multiples of 30°. Expressed in another way, the regular polygons which may be considered are three-sided, four-sided or six-sided.

The modules are suitably mounted on a framework which reflects the pattern formed by the modules. Fixing of the modules in position may, for example, be effected by means of screw-threaded attachment means at the center thereof, which cooperate with complementary screw-threaded means on the associated fuel nozzle or the fuel-supply pipe leading to the fuel nozzle.

BRIEF DESCRIPTION OF DRAWINGS

The invention will now be described, by way of example, with reference to the accompanying drawings, in which.

DESCRIPTION OF PREFERRED EMBODIMENTS

Figure 1:
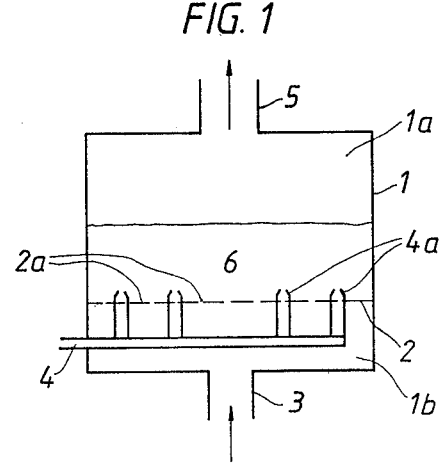
FIG. 1 is a schematic sectional side view of a fluidizable bed combustion chamber.

FIG. 1 shows a fluidizable bed combustion chamber comprising a chamber 1 provided with an intermediate partition 2 which divides the chamber into an upper combustion space 1a and a lower plenum chamber 1b. Fluidizable material 6, consisting normally of crushed mineral material and/or ash, rests on the partition 2. The material 6 is fluidized, in use of the combustion chamber, by air supplied to the plenum chamber 1b via a tube 3 and which passes upwardly through the partition 2 through openings 2a in the latter. Fuel, which may be liquid, gaseous or solid, or any combination of these, is supplied, via a branched pipe 4 and nozzles 4a, to the fluidized bed where it mixes with the air and is burnt. The exhaust gases depart through a tube 5 at the top of the chamber 1.

Figure 2:
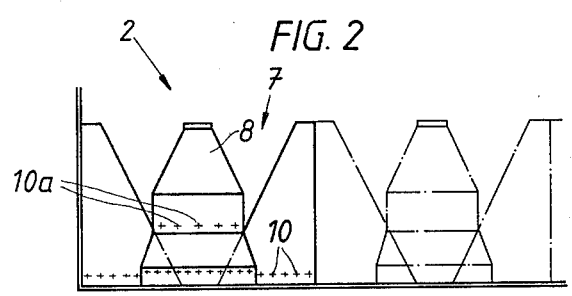
FIG. 2 is a schematic sectional side view on an enlarged scale and taken on the line II-II in FIG. 3, of part of one embodiment of the intermediate partition of the combustion chamber of FIG. 1.
Figure 3:
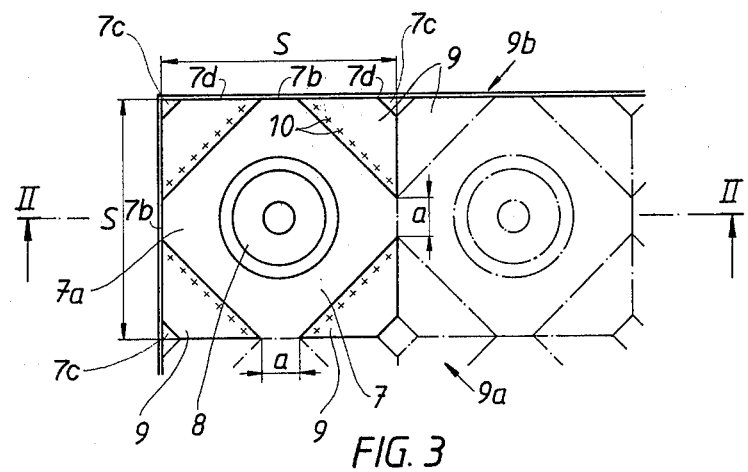
FIG. 3 is a plan corresponding to FIG. 2.

FIGS. 2 and 3 show part of one embodiment of the partition 2 of FIG. 1, which is built up from nested quadratic modules 7. Each of the modules 7 (which all have the side dimension S) has a substantially plane floor portion 7a. At the center of the floor portion 7a is a generally coniform, upright portion 8 which surrounds one of the fuel supply nozzles 4a shown in FIG. 1. The portion 8 may also have means for the supply of combustion air from the plenum chamber 1b (FIG. 1), for example openings 10a in the side of portion 8. As shown in FIGS. 2 and 3, each module 7 is defined by a plurality of pairs of side edges 7b which extend toward a corresponding plurality of corners 7c. The opposite end portions 7d of each side edge 7c extend radially outwardly and upwardly from floor portion 7a to define radially outwardly and upwardly inclined corner surfaces 9 which extend away from the center of the module. Inclined corner surfaces 9 and floor portion 7a may be made from a flat sheet of metallic material suitably folded to form the upwardly inclined corner surfaces.

Where the corner surfaces 9 of four nested modules 7 come together, a pyramid 9a with a quadratic basal area is formed. At the sides of the combustion chamber 1, where the corner surfaces of pairs of modules 7 come together, semi-pyramids 9b with a triangular basal area are formed. In the sides of the pyramids 9a and semi-pyramids 9b there are holes 10 for the supply of combustion air from the plenum chamber 1b (FIG. 1). The holes 10 of each module 7 face inwardly towards the coniform portion 8 of the module to ensure the desired mixing of fuel and air. The plane floor portion 7a extends to each side edge 7b of the module, between adjacent upwardly inclined corner surfaces 9, along the length a shown in FIG. 3. In this way the assembled modules will together form a coherent surface, on which is formed a pattern of evenly distributed fuel supply nozzles and air inlet openings, and over which the lowest material in the fluidized bed can pass freely.

Figure 4:
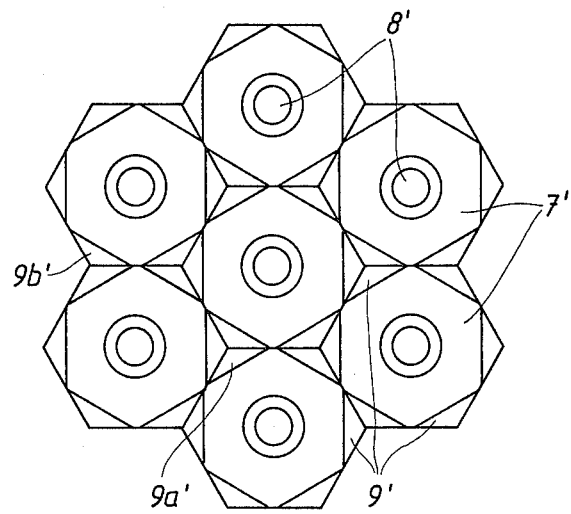
FIGS. 4 and 5 are schematic plans of two further embodiments of intermediate partitions of the combustion chamber of FIG. 1.
Figure 5:
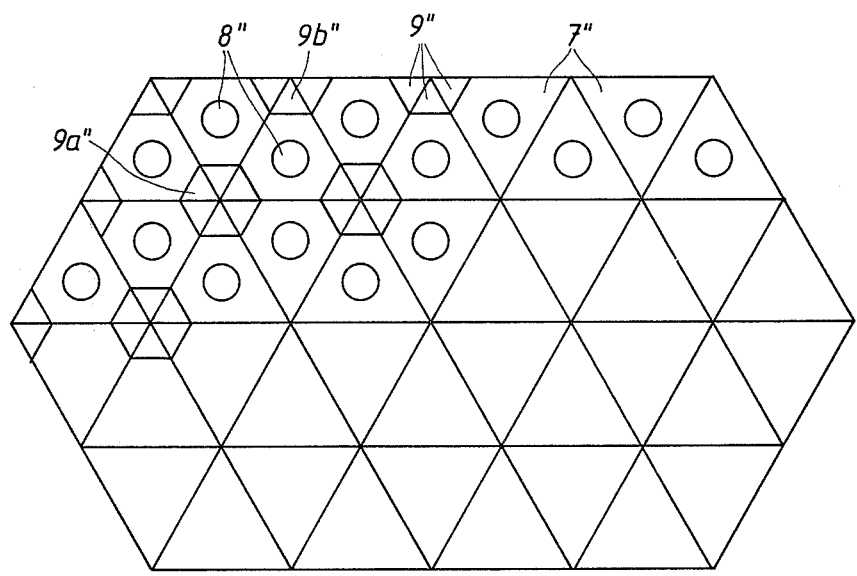

The quadratic modules shown in FIGS. 2 and 3 are well suited for a fluidizable bed combustion chamber of rectangular shape. However, in recent years there has been a trend towards designing fluidizable bed combustion chambers which, in plan, are of circular or annular shape. For combustion chambers of these shapes it is more convenient to use either hexagonal modules 7', shown in FIG. 4, or triangular modules 7", shown in FIG. 5. The principle is, however, the same, namely that each module is provided with a central portion 8' (FIG. 4) or 8" (FIG. 5) for accommodating a fuel supply nozzle and has upwardly inclined corner surfaces 9' (FIG. 4) or 9" (FIG. 5) which, when the modules are assembled together, form pyramids 9a' of triangular basal area (FIG. 4) or pyramids 9a" of hexagonal basal area (FIG. 5), or corresponding partial pyramids 9b' (FIG. 4) or 9b" (FIG. 5) at the sides of the combustion chamber. As in the case of the embodiment of FIGS. 2 and 3, the central portions 8' and 8" and the inclined corner surfaces 9' and 9" are provided with openings (not shown) for supply of combustion air from the plenum chamber 1b (FIG. 1). Between the pyramids there are again plane floor portions allowing the bed material to pass freely between the modules.

In each of the above described embodiments, it is easy to replace worn or burnt modules during service inspection.

What is claimed is:

1. In a fluidizable bed combustion chamber comprising an intermediate partition which divides said chamber into an upper combustion space and a lower plenum and which is provided with means for injecting air and fuel into said upper combustion space in which, in use of the combustion chamber, a bed of fluidized material is created, the improvement according to which said intermediate partition is composed of modules each having side edges defining a polygonal shape, a substantially centrally positioned fuel supply member and upwardly inclined corner surfaces defined by portions of said side edges which are upwardly inclined in the direction away from the center of the module, said corner surfaces comprising openings enabling air to be injected into said upper combustion space from said lower plenum.

2. A fluidizable bed combustion chamber according to claim 1, wherein each of said modules is of regular polygonal shape.

3. A fluidizable bed combustion chamber according to claim 2, wherein the corner angles of said modules are integer multiples of 30°.

4. A fluidizable bed combustion chamber according to claim 1, wherein pyramids are formed by the contiguous upwardly inclined corner surfaces of immediately adjacent modules.

5. A fluidizable bed combustion chamber according to claim 4, wherein each module comprises a substantially plane floor between said centrally positioned fuel supply member and said corner surfaces, said floor extending to each side of the module between said corner surfaces.

6. A fluidizable bed combustion chamber according to claim 1, wherein said fuel supply member comprises a generally coniform member.

7. A fluidizable bed combustion chamber according to claim 6, wherein said coniform member is provided with openings enabling air to be injected into said upper combustion space from said lower plenum.

8. A fluidizable bed combustion chamber according to claim 5, wherein said substantially plane floor and said corner surfaces are formed from a folded sheet of metallic material.

9. A fluidizable bed combustion apparatus, comprising:
a chamber;
an intermediate partition dividing said chamber into an upper combustion space and a lower plenum, said partition comprising a plurality of polygonal modules, each module including:
a plurality of pairs of side edges extended toward a plurality of corners;
a substantially centrally positioned fuel supply member, said member having a base;
a floor portion extended radially from said base;
a plurality of inclined corner surfaces extended radially outwardly and upwardly from said floor portion toward each of said corners, each said corner surface being defined by radially outwardly and upwardly extended end portions of one of said pairs of side edges; and
a plurality of openings in said inclined corner surfaces for allowing the passage of air from said lower plenum into said upper combustion space; and
means for injecting fuel through said fuel supply member and air through said plurality of openings.

10. Apparatus according to claim 9, wherein each of said modules is regular polygonal shape.

11. Apparatus according to claim 10, wherein the corner angles of said modules are integer multiples of 30°.

12. Apparatus according to claim 9, wherein pyramids are formed by the contiguous inclined corner surfaces of immediately adjacent modules.

13. Apparatus according to claim 12, wherein said floor portion is substantially planar and extends to said side edges between said inclined corner surfaces.

14. Apparatus according to claim 13, wherein said floor portion and said inclined corner surfaces are formed from a folded sheet of metallic material.

15. Apparatus according to claim 9, wherein said fuel supply member comprises a generally coniform member.

16. Apparatus according to claim 15, wherein said coniform member comprises openings for allowing passage of air from said lower plenum to said upper combustion space.

* * * * *